Sept. 2, 1941.  J. K. HOLBROOK  2,254,368
MICROFILM VIEWER
Filed Feb. 24, 1939  3 Sheets-Sheet 1

INVENTOR
John Knight Holbrook
BY
Morgan, Finnegan & Durham
ATTORNEYS

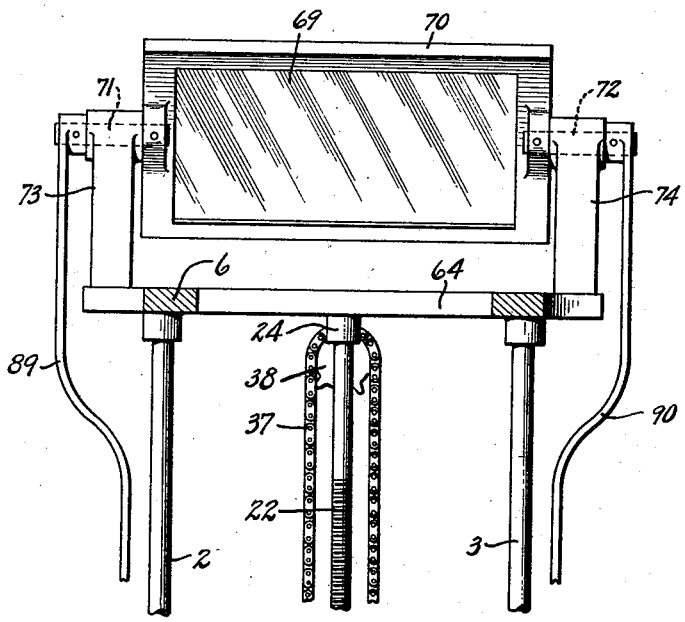
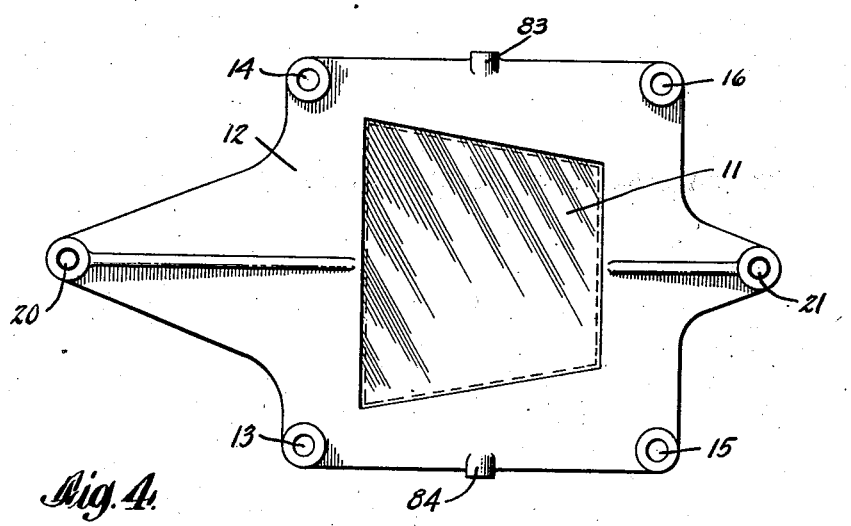

Patented Sept. 2, 1941

2,254,368

UNITED STATES PATENT OFFICE 2,254,368

MICROFILM VIEWER

John Knight Holbrook, New York, N. Y., assignor to Holbrook Microfilms, Inc., New York, N. Y., a corporation of New York Application February 24, 1939, Serial No. 258,235

8 Claims. (Cl. 88—24)

The invention relates to new and useful improvements in micro-film viewers and more especially to such improvements in means for varying the positions of the various cooperating devices, such as the projector, mirror and screen, in order to quickly and readily view and examine different selected areas on a film at different magnifications as desired.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a fragmentary elevation on line 3—3 of Fig. 1; and

Fig. 4 is a detached plan of the mirror carrier.

Figure 1:
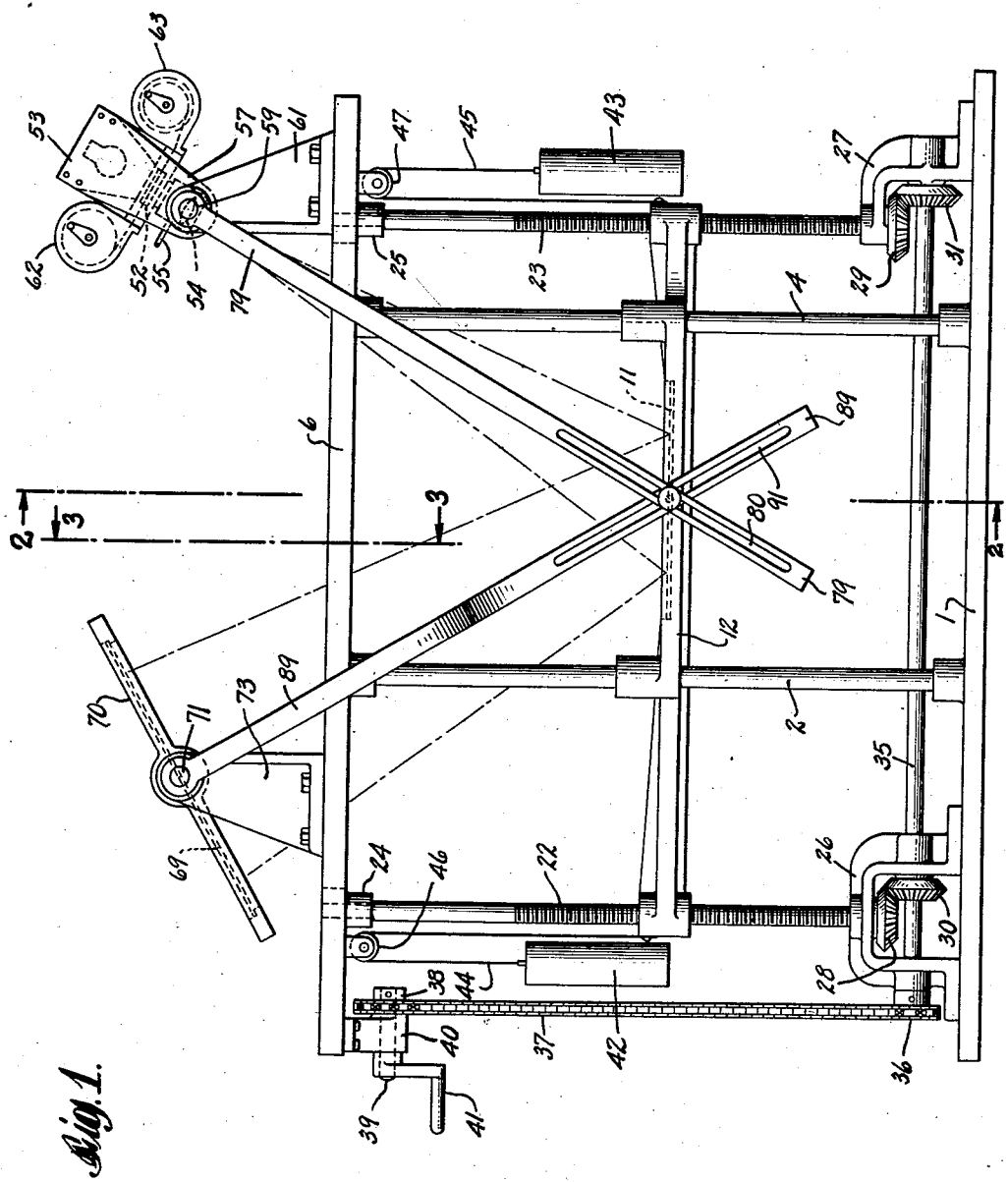
Fig. 1 is an elevation of a machine embodying the invention.
Figure 2:
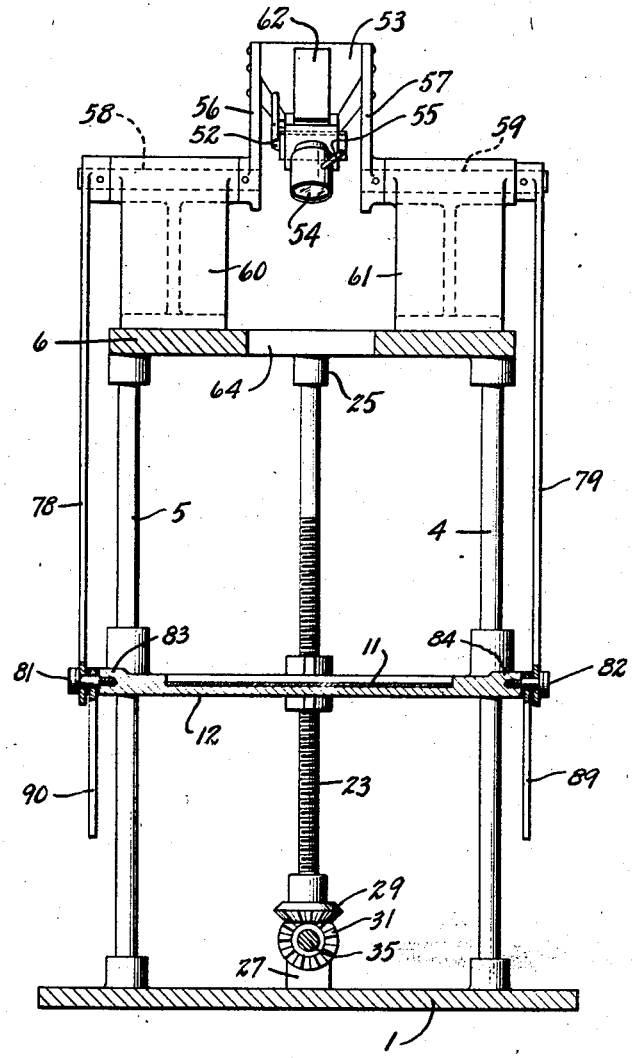
Fig. 2 is a transverse vertical section on line 2—2 of Fig. 1.

Objects of the invention are to provide for facile and rapid examination of various selected loci and areas of micro-films, that is, different selected parts and different sized areas of film may be quickly and readily projected onto a screen in various selective degrees of magnification as desired; to provide for instantaneous optional examination of an entire frame of micro-film at a certain degree of magnification and to quickly and easily project only a portion of the area of said frame onto the screen, thus permitting greater magnification of such sub-area, for instance the micro-photograph of an entire document may be projected and studied, and then quickly and successively it may be examined line by line under much greater magnification; further, to provide mechanism including a projector, a mirror and a screen, the distance between the projector and mirror, at least, being variable to vary the film area projected onto and reflected from the mirror and also including means whereby the projector and screen, and if desired, the mirror, may be variably angularly positioned to compensate for changes in the angles of incidence and reflection at the mirror; to provide such mechanism wherein the mirror, projector and screen are mechanically connected so that they are kept in proper positional relation as the distance between the projector and mirror is changed to vary the area and size of the mirror image. Other objects and features of the invention will be stated in, or will be obvious from the following detail description of the present preferred embodiment.

The invention as embodied is adapted to project micro-films having successive frames arranged in the usual strip form, the mechanism comprising a mirror, onto which the film image is projected at an angle by a projector, and a screen which receives the projected image from the mirror, the image being viewable and examinable at the screen. As here embodied, the mirror is movable toward and from the projector and the screen, the projector and screen not having translational movement but being angularly movable to conform to the changes in the angles of incidence and reflection at the mirror; and means are provided for automatically regulating the angular position of the projector and screen as the mirror is moved nearer or farther away. In said embodiment, a frame is provided having a base 1, and four rods 2, 3, 4 and 5 are fixed thereto and extending upwardly therefrom, these rods serving both as frame supports and as guides for the mirror carrier. Fixed to and supported upon the upper end of the rods is a horizontally-disposed table 6. A plane mirror 11 is mounted in a horizontally-disposed carrier 12, the carrier having apertures 13, 14, 15 and 16 which encircle the vertically-disposed rods 2–5 to constitute the guiding means for the mirror carrier and mirror as they are moved to and fro.

The embodied means for moving the mirror carrier to and fro vertically comprises screw-threaded apertures 20 and 21 formed in medianly-located extension arms of the carrier 12. Within these openings and having screw-threaded engagement therewith are rotatable screw-rods 22 and 23, which are journaled at their top ends in lugs 24 and 25 formed on the under side of the table 6. At their lower ends, the screw-threaded rods are journaled, respectively, in brackets 26 and 27 fixed to and extending upwardly from the base plate 1. Fixed to the bottom ends of the screw rods are bevel gears 28 and 29, which mesh, respectively, with bevel gears 30 and 31, which are fixed on a horizontally-disposed shaft 35, which is journaled in brackets 26 and 27. The means for rotating the shaft 35 comprise a sprocket 36, fixed to one end of the shaft, over which runs a sprocket chain 37, which also runs over a sprocket 38, fixed on a short shaft 39, which shaft is journaled in a bracket 40, fixed to and dependent from the lower face of the table 6. A crank 41 is fixed to the shaft 39. Suitable counter-weights 42 and 43 may be employed, and these are shown suspended on cords 44 and 45 which run, respectively, over pulleys 46 and 47, and are attached to the extension arms of the carrier 12 close to the screw-threaded apertures 20 and 21.

A projector 53, which may be of some standard or other suitable form, having a lens 54 and focusing means 55, is mounted on a pair of arms 56 and 57. The arms at their opposite ends are fixed, respectively, to shafts 58 and 59 which are journaled in brackets 60 and 61, fixed to and extending upwardly from the table 6, the projector lens being in line with the axes of the shafts. Film shifting means 52 of any suitable kind may be provided as desired. The projector is provided with suitable film reels 62, 63 and suitable film moving and locating means. An aperture 64 in the table 6 permits the projection of the image onto the mirror and from the mirror onto the screen, as indicated diagrammatically in Fig. 1. An image-receiving screen 69 is mounted in a frame 70, to which frame are fixed trunnions 71 and 72, which are journaled, respectively, in brackets 73 and 74, fixed to and extending upwardly from the table 6.

Means are provided for angularly moving the projector and the mirror concomitantly with the translational movement of the mirror, to compensate for the variations in the angles of incidence and reflection due to variations in the position of the mirror relatively to the projector and screen. As embodied, a pair of arms 78 and 79 are fixed to the outer ends, respectively, of the shafts 58 and 59, and extend downwardly and inwardly toward the mirror. The lower ends of these arms have longitudinal slots 80 formed therein, and passing through these slots are cap-screws 81 and 82, which are screw-threaded into lugs 83 and 84 formed in the side frames of the mirror carrier 12, the heads of the cap screws being of greater diameter than the slots 80. Likewise, fixed to the outer ends of the trunnions 71 and 72 of the screen frame 70 are a pair of arms 89 and 90, extending inwardly and downwardly and having elongated slots 91 formed in their lower portion. The cap screws 81 and 82 pass through both slot 80 and slot 91 at either side, and thus as the mirror carrier and mirror are moved up and down vertically, and normally to the mirror plane, the projector and screen are rotated in their bearings and are maintained in the proper angular relation to the mirror.

The invention in its broader aspects is not limited to the specific mechanisms shown and described but departures may be made therefrom within the scope of the accompanying claims without departing from the principles of the invention and without sacrificing its chief advantages.

What I claim is:

1. A micro-film viewer including in combination a frame, bearings mounted in fixed position near one end of said frame, a projector pivotally mounted in said bearings, other bearings mounted in fixed position near the opposite end of said frame, a screen pivotally mounted in said last-named bearings, a mirror, a carrier on which the mirror is mounted located centrally of said frame and below the projector and screen, said carrier being mounted for rectilinear movement, means for imparting rectilinear movement to the mirror carrier, and means connected between said carrier and the projector and screen for angularly moving the projector and screen when the carrier is moved rectilinearly to compensate for changes in the angles of incidence and reflection at the mirror.

2. A micro-film viewer including in combination a frame, bearings mounted in fixed position on said frame, a projector pivotally mounted in said bearings, other bearings mounted in fixed position on the opposite end of said frame, a screen pivotally mounted in said last-named bearings, a mirror, a carrier on which the mirror is mounted below said frame to receive the projection beam and to direct the same to said screen, screw rods having threaded engagement with the mirror carrier, means for rotating the screw rods to move the carrier to and fro on its guides towards or away from said frame and means for angularly moving the projector and screen when the carrier is moved to compensate for changes in the angles of incidence and reflection at the mirror.

3. A micro-film viewer including in combination a frame, a projector pivotally mounted in bearings on said frame, a screen pivotally mounted in bearings on the opposite end of said frame, a mirror, a carrier on which the mirror is mounted below said frame to receive the projection beam and to direct the same to said screen, screw rods having threaded engagement with the mirror carrier, means for rotating the screw rods to move the carrier to and fro on its guides and pairs of slotted arms fixedly connected to the projector and screen, respectively, and means on said carrier engaging slots in an arm of each pair for angularly moving the projector and screen when the carrier is moved towards or away from said frame to compensate for changes in the angles of incidence and reflection at the mirror.

4. A micro-film viewer including in combination a frame, bearings mounted in fixed position on said frame, a projector pivotally mounted in said bearings, other bearings mounted in fixed position on the opposite end of said frame, a screen pivotally mounted in said last-named bearings, a mirror, a carrier on which the mirror is mounted below said frame to receive the projection beam and to direct the same to said screen, screw rods having threaded engagement with the mirror carrier, means for rotating the screw rods to move the carrier to and fro on its guides and pairs of slotted arms fixedly connected to the projector and screen, respectively, and means on said carrier engaging slots in an arm of each pair for angularly moving the projector and screen when the carrier is moved towards or away from said frame to compensate for changes in the angles of incidence and reflection at the mirror.

5. A micro-film viewer including in combination a frame, bearings mounted in fixed position on said frame, a projector pivotally mounted in said bearings, other bearings mounted in fixed position on the opposite end of said frame, a screen pivotally mounted in said last-named bearings, a mirror, a carrier on which the mirror is mounted below said frame to receive the projection beam and to direct the same to said screen, guides on which the carrier is mounted for rectilinear movement, screw rods having threaded engagement with the mirror carrier, means for rotating the screw rods to move the carrier to and fro on its guides, pairs of slotted arms fixedly connected to the projector and screen, respectively, and means on said carrier engaging slots in an arm of each pair for angularly moving the projector and screen when the carrier is moved towards or away from said frame to compensate for changes in the angles of incidence and reflection at the mirror.

6. A microfilm viewer including in combination a pivotally mounted projector, a pivotally mounted viewing screen, a mirror for reflecting the projected image onto the screen, means for moving the mirror toward and from the projector and screen along a line bisecting the axis of the incident and reflected images to vary the image size on the screen and means interconnecting the projector, screen and mirror for pivotally moving the projector and screen and maintaining substantially equal the angular position of the projector and screen relative to the mirror.

7. A microfilm viewer including in combination a pivotally mounted projector, a pivotally mounted viewing screen, a mirror for reflecting the projected image onto the screen, means for moving the mirror toward and away from the projector and screen along a line bisecting the axis of the incident and reflected images to vary the image size on the screen, arms extending from the projector and screen and means interconnecting said arms at the mirror for pivotally moving the projector and screen, said interconnecting means lying at the intersection of lines perpendicular to the screen and the focal plane of the projector and passing through the pivot points of the screen and projector.

8. A microfilm viewer including in combination a pivotally mounted projector, a pivotally mounted viewing screen, a mirror for reflecting the projected image onto the screen, means for moving the mirror toward and away from the projector and screen to vary the image size on the screen, an arm lying in a plane normal to the focal plane of the projector and passing through its pivotal axis, an arm lying in a plane normal to the screen and passing through its pivotal axis and means slidably interconnecting the arms with the mirror at their intersection.

JOHN K. HOLBROOK.